Aug. 16, 1932.  B. T. ANDREN ET AL  1,872,055
WELDING TUBULAR ARTICLES
Filed March 12, 1930  5 Sheets-Sheet 5
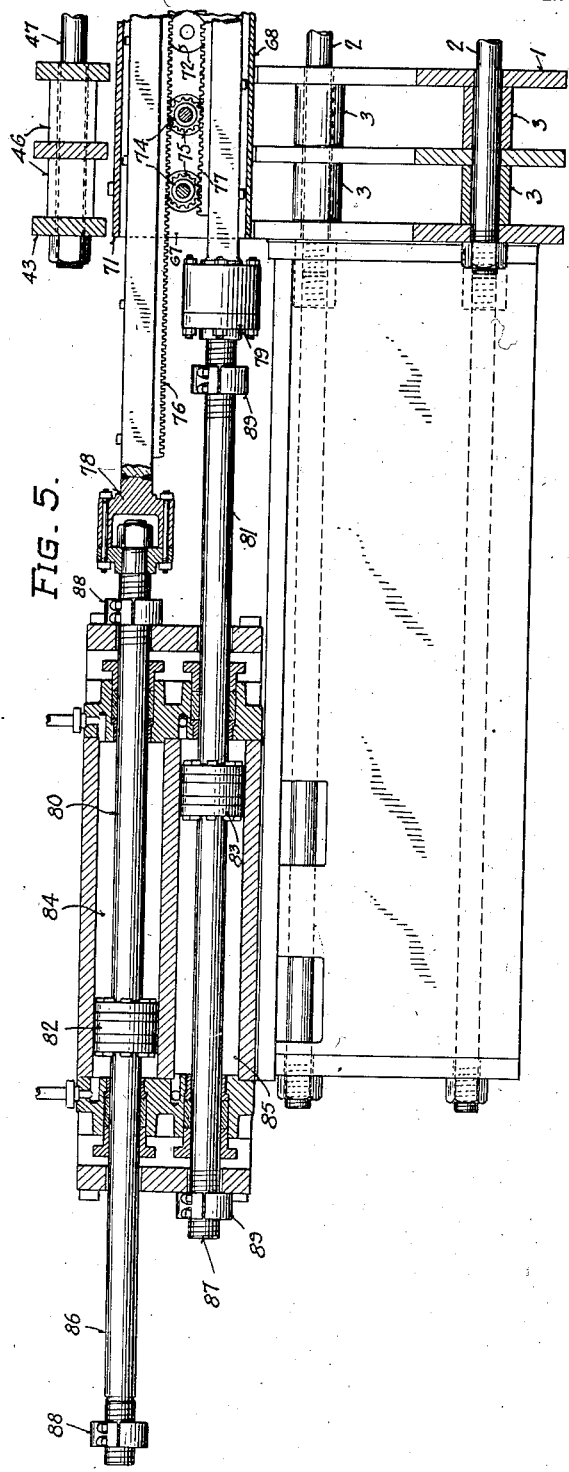
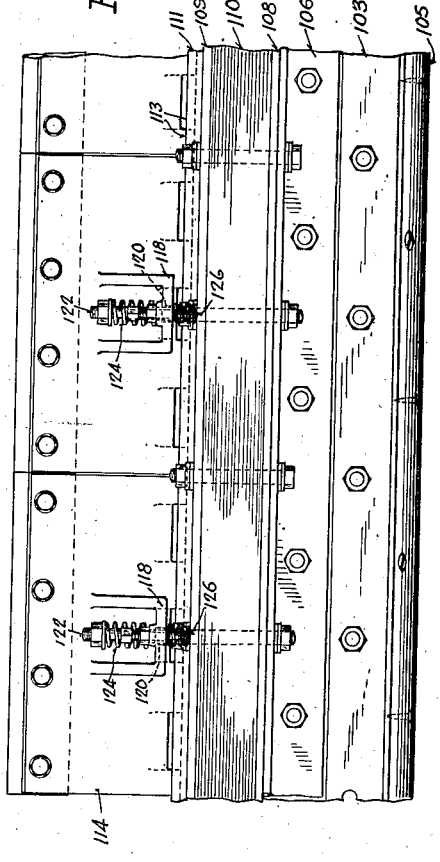
INVENTORS:
BIRGER T. ANDREN
WARREN F. HEINEMAN
BY AND WILLIAM E. CRAWFORD
ATTORNEY.

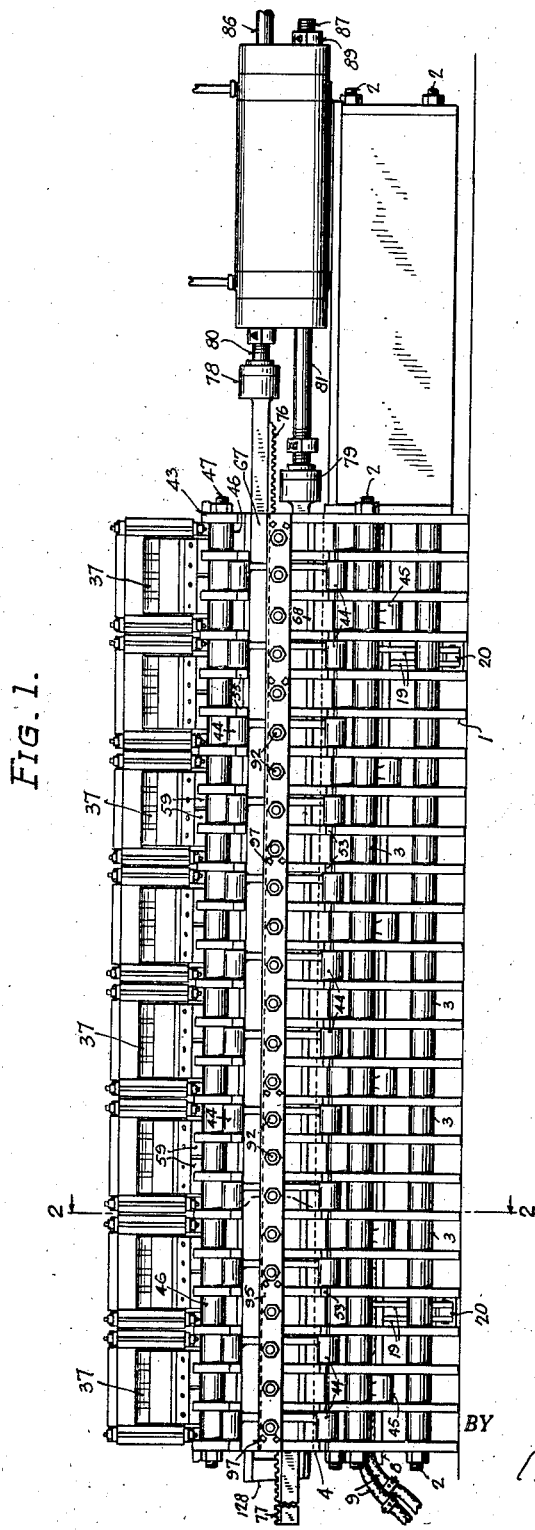

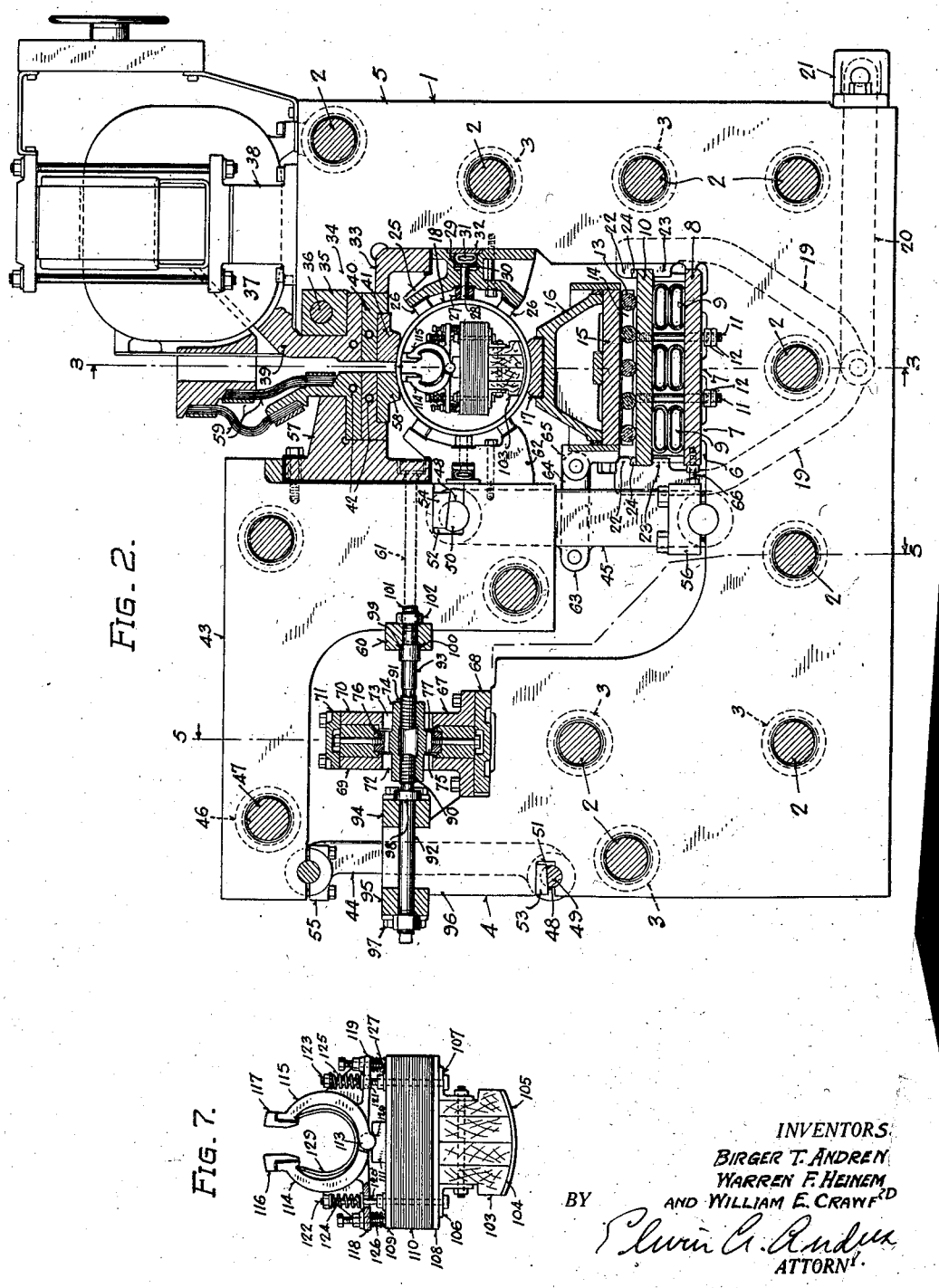

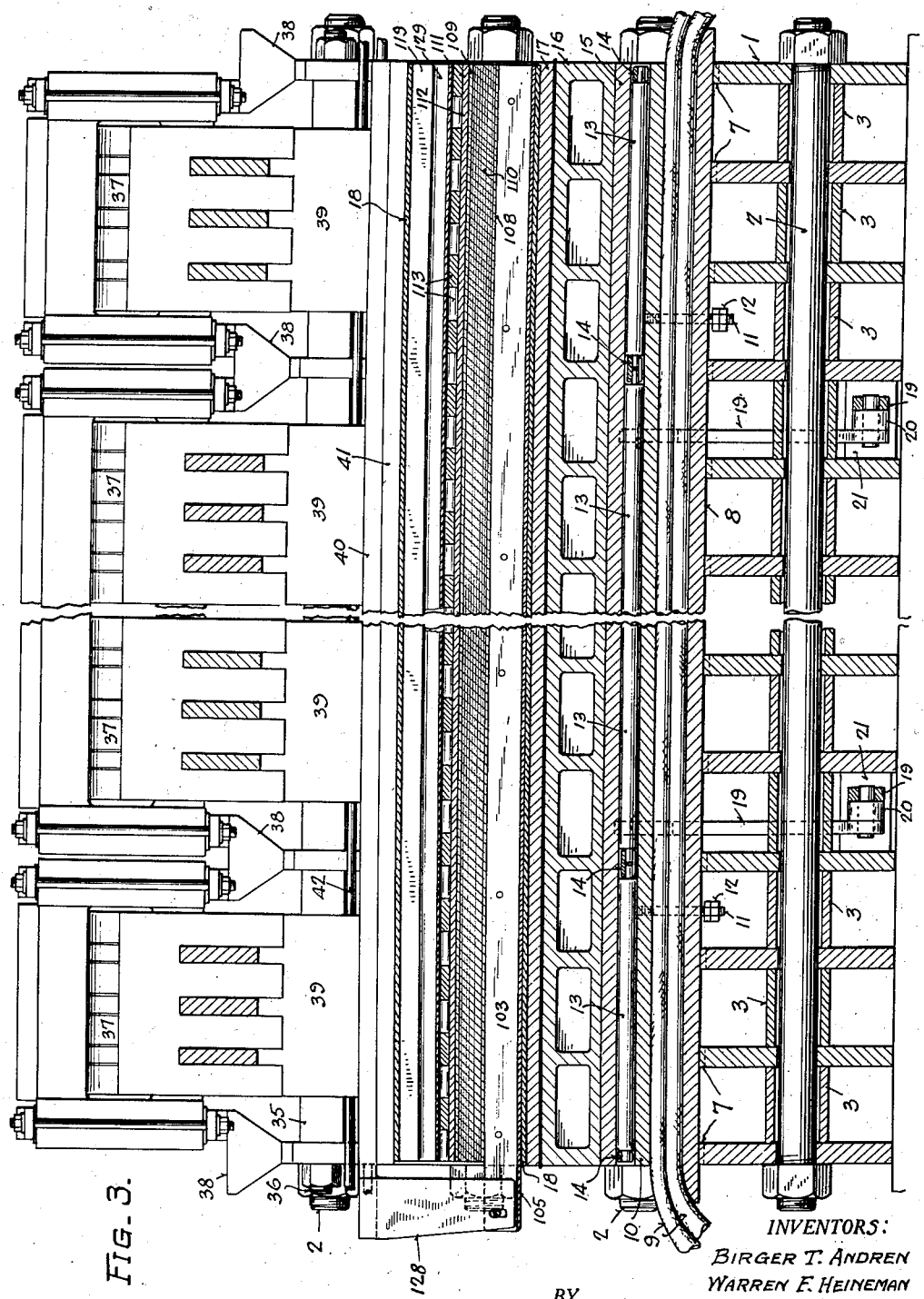

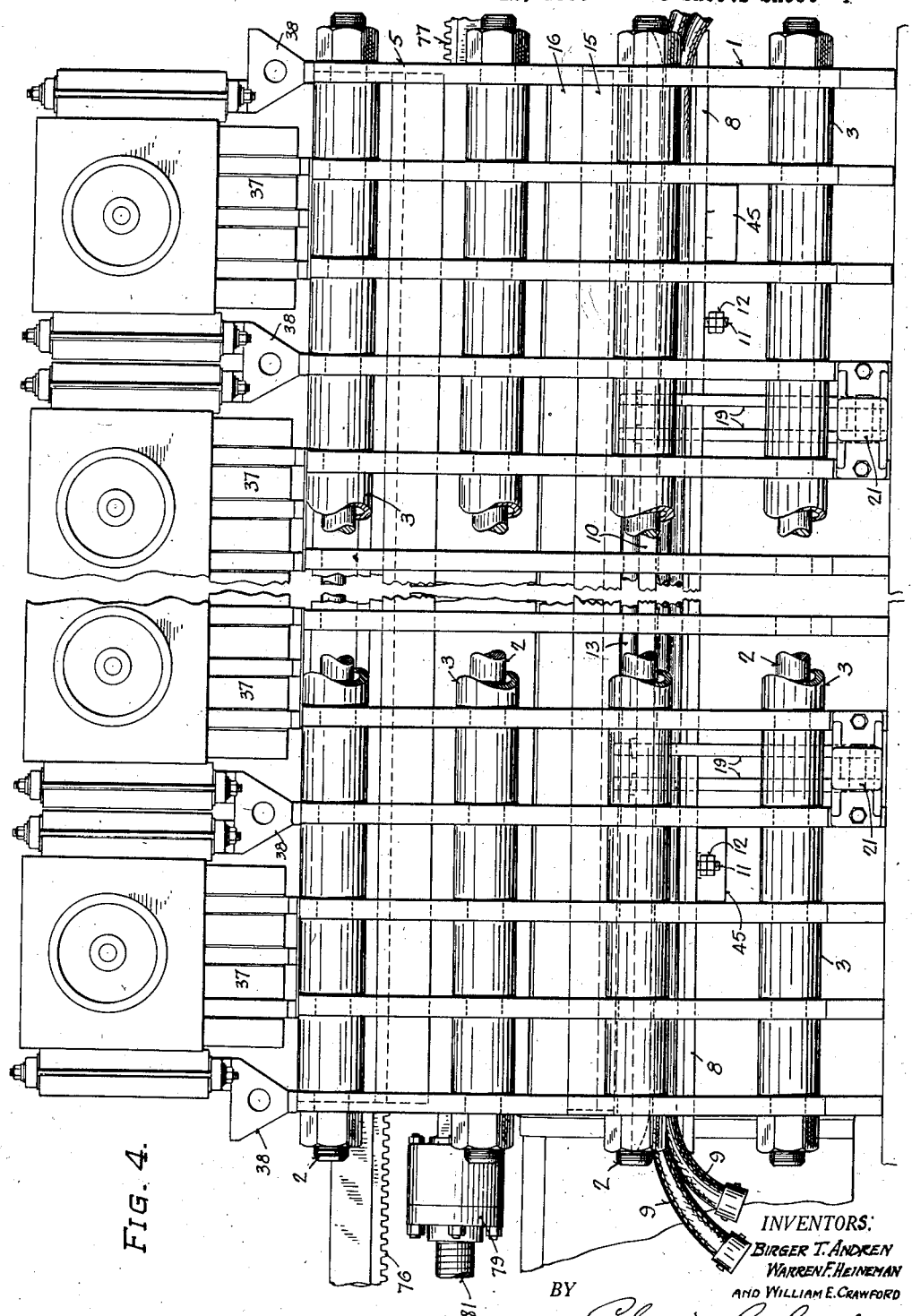

Patented Aug. 16, 1932

1,872,055

UNITED STATES PATENT OFFICE

BIRGER T. ANDREN, OF MILWAUKEE, WARREN F. HEINEMAN, OF SHOREWOOD, AND WILLIAM E. CRAWFORD, OF WAUWATOSA, WISCONSIN, ASSIGNORS TO A. O. SMITH CORPORATION, OF MILWAUKEE, WISCONSIN, A CORPORATION OF NEW YORK

WELDING TUBULAR ARTICLES

Application filed March 12, 1930. Serial No. 435,090.

This invention relates to the welding of longitudinal seams in tubular articles and particularly to the manufacture of tubular articles of substantial lengths by the flash welding process.

The flash welding operation as distinguished from other forms of electric welding consists in establishing an electric arc between the edges to be welded for the full length thereof and maintaining the electric arc by moving the edges relative to each other until a predetermined amount of metal has been burned or flashed from the edges and the metal at the edges has been raised to a welding temperature, after which the edges are pressed together with considerable pressure to firmly and integrally unite the same.

The electric welding of tubular articles of substantial lengths by the flash welding process, above referred to, has presented serious difficulties and problems which have not heretofore been surmounted, and as a result, the manufacture of electrically welded pipe and other long tubular articles has been limited to the arc and resistance welding methods, the latter method being further limited to the manufacture of thin wall mechanical tubing which is not ordinarily subjected to substantial fluid pressures.
One of the objects of the present invention is to flash weld longitudinal seams in tubular articles.

Another object of the invention is to provide a method and apparatus for welding longitudinal seams in tubular articles.

Another object of the invention is to provide a method and apparatus which will more rapidly and effectively weld comparatively thick walled tubular articles of substantial length.

Another and more specific object of the invention is to provide a method and apparatus which will overcome the problems incident to the flash welding of tubular articles.
Among the major difficulties presented in the flash welding of tubular articles, the following may be briefly mentioned. First, the bringing of the edges into and maintaining the same in accurate alignment during the welding operation. The proper and accurate alignment of the edges during the flashing operation is essential to the maintenance of an arc of uniform characteristics throughout the length of the edges. This problem is particularly difficult in the welding of tubular articles in that the edges to be welded are connected together and the movement of one edge will necessarily effect the opposite edge unless some proper means is provided for securely clamping the same. The length of the tubular blank, the limited space within the same and the rigidity of the walls thereof makes it difficult to provide sufficient clamping mechanism to maintain and hold the edges in accurate alignment during the movement of the same.

Secondly, provision of practical means for moving the edges relatively to each other at a carefully controlled variable speed to compensate for the flashing off of the edges and for maintaining an arc of uniform length.

Thirdly, the difficulty of maintaining a firm non-slipping contact between the welding electrodes and the walls of the tubular blank while the edges are being moved during the flashing operation, so as to prevent burning of the electrode contacts and to distribute the current uniformly to the edges for the full length thereof. Again the limitations and physical characteristics of the blank operated upon makes the problem particularly difficult in the flash welding of long tubular articles.

The machine embodying the present invention provides a practical means for overcoming the above and numerous other difficulties incident to the flash welding of tubular articles.

The invention makes possible the welding of tubular articles of substantial lengths and relatively thick walls in a small fraction of the time necessary for welding processes heretofore employed. In addition to the time element, the reduction in space required, the reduction in necessary energy consumed, the uniformity of welded product obtained, and many additional features make the present invention beyond comparison to the present processes.

Numerous objects and advantages of the invention will become apparent from the following detailed description and the accompanying illustrations thereof.

In the drawings:

Fig. 1 is a front side elevation of the machine showing the preferred embodiment.

Fig. 2 is a transverse sectional view of the machine taken on line 2—2 of Fig. 1.

Fig. 3 is a longitudinal sectional view of the machine taken on line 3—3 of Fig. 2, parts being omitted.

Fig. 4 is a broken rear side elevation of the machine.

Fig. 5 is a sectional view taken on line 5—5 of Fig. 2.

Fig. 6 is a fragmentary side elevation of the arbor.

Fig. 7 is an enlarged end elevation of the arbor.

Referring now to the illustrations, the reference character 1 denotes a stationary frame comprising a plurality of frame members arranged in spaced relation and extending transversely of the machine. The frame members are connected by a plurality of stay bolts 2 and are maintained in uniform spaced relation by the tubular spacers 3 encasing the stay bolts between the individual frames, as shown in Fig. 3.

The frame members form a support for the operating mechanism of the machine and are roughly of U-shape having an irregular contour with up-standing legs 4 and 5.

The upper face 6 of the frames between the legs 4 and 5 is provided with a plurality of projections 7 which support a plate 8 extending longitudinally of the machine, as shown in Fig. 2. The plate is secured to the frame 1 in any suitable manner, and supported upon the upper surface of the plate are a plurality of superimposed flexible tubes 9 adapted to receive fluid pressure from any suitable source.

Resting upon the flexible tubes is a longitudinally extending plate 10 disposed directly above the plate 8 and spaced therefrom by the flexible tubes 9. The plate 10 is provided with a plurality of downwardly extending guide rods 11 which extend through the lower plate 8 and are provided at their lower ends with nuts 12 for adjustably limiting the upward movement of the plate 10.

Supported upon the upper surface of the plate 10 are a plurality of longitudinally extending rollers 13 which are uniformly spaced from each other by the spacing bars 14.

The rollers 13 support a carriage 15 which extends longitudinally for the full length of the machine and is adapted for a limited transverse movement on the rollers 13. The carriage 15 is provided with a bracket 16 having recesses on the upper surface thereof for receiving a longitudinally extending plate 17 adapted to support the tubular blank 18 to be welded. The upper surface of the plate 17 is curved to conform to the curvature of the tubular blank.

From the above description, it will be clear that the tubular blank may be raised and lowered by the proper control of fluid pressure within the flexible tubes 9. The flexible tubes thus provide a yielding, floating and extensible support for the blank and will maintain an effective substantially constant pressure contact between the welding electrodes and the tubular blank regardless of the resultant reduction in diameter of the blank during the flashing operation and will compensate for mechanical irregularities in the machine and tubular blank and thus insure an effective non-slipping contact between the electrodes and the tubular blank while the edges are being moved during the flashing operation.

In order to maintain the plate 10 in a flat horizontal position at all times, regardless of the differences in pressure in the individual flexible tubes and the relative position of the carriage 15, the plate is connected to angular equalizing arms 19 which extend downwardly between certain of the frame members and are pivotally connected at their lower ends to links 20 in any suitable manner. The outer ends of the links 20 are pivotally connected to brackets 21 which are secured to the lower ends of the adjacent frame members, as shown in Fig. 2.

The upper ends of the equalizing arms may be secured to the plate 10 in any suitable manner. As shown in the drawings, the equalizing arms have inwardly extending vertically spaced projections 22 and 23 between which seat opposite edge portions of the plate 10 which are secured in position by wedge members 24. The lower projections 23 may form a stop for limiting the downward movement of the plate 10 when the pressure within the flexible tubes 9 is relieved. By removing the wedges 24, the equalizing arms may be withdrawn from the plate 10 and by removing the guide rods 11, access may be readily had to the flexible tubes and repairs and replacements rapidly effected.

The clamping mechanism for firmly holding the blank in position during the welding operation and the electrode contacts for conducting the current to the work, comprise broadly a stationary clamping jaw and stationary electrode and a horizontally movable clamping jaw and electrode.

It is understood, however, that the invention is not to be so limited and that a pair of movable electrodes and movable clamping jaws might readily be substituted without departing from the spirit of the invention.

The stationary clamping jaw comprises a longitudinally extending bracket 25 secured to the inner face of the legs 5 of the individual frame units. The bracket is provided with an arcuate inner surface having inwardly extending spaced clamping bars 26 adapted to engage the side wall of the tubular blank along one side of the same. The clamping bars are preferably insulated from the bracket 25 in any suitable manner.

As is shown in Fig. 2, the central clamping bar 27 is provided with spaced apertures along the same for receiving insulated pins 28 which slidably extend through bracket 25 into a longitudinally extending recess 29 and are secured at their ends to a plate 30. The plate 30 is backed by a small flexible tube 31 connected to a source of fluid supply under pressure. The tube 31 is retained in position within the recess by a covering plate 32.

From the above description, it will be noted that the pins 28 within the central clamping bar may be advanced by fluid pressure within the tube 31 independently of the movement of the clamping jaws.

Extending upwardly from the stationary clamping bracket 25 is an L-shaped longitudinally extending reinforcement member 33 which is firmly secured to the inner walls of the legs 5 of the individual frame members. The legs 5 of the frame members have inwardly extending top portions 34 between which blocks 35 are secured in any suitable manner, such as for example, a tie rod 36 extending through the blocks and the inwardly projecting top portions 34. The blocks 35 and the reinforcing member 33 firmly secure the frame members to each other and form a backing support for an electric terminal which is connected to a plurality of welding transformers 37. The transformers are supported in spaced relation upon the top wall of the legs 5 of the frame members by the brackets 38.

The electric terminal preferably comprises a conductor 39, an intermediate bearing plate 40 and the electrode contact 41. The intermediate plate 40 may be omitted, if desired, its function being to facilitate replacement of worn parts.

The conductor 39 is recessed to provide faces which are adapted to engage the side and lower walls of the blocks 35, as shown in Fig. 2, and are secured thereto in any suitable manner.

The electrode contact 41 extends longitudinally of the tubular blank and engages the same for the full length thereof adjacent one of the edges to be welded. The lower face of the electrode contact is preferably curved to conform to the curvature of the tubular blank. Cooling tubes 42 for the electric terminals may be provided, if desired.

When welding extremely long blanks, such as pipe sections, it is desirable to build the electrodes and electrode supports of a plurality of interlocked and overlapping sections. The individual sections of the electrode contacts may, if desired, be spaced a slight distance from each other to prevent injurious flow of current longitudinally of the electrodes and the blank.

The movable clamping jaw and electrode are secured to a plurality of reciprocable platens 43 forming an auxiliary frame adapted to rock on vertically extending links 44 and 45 which are pivotally connected to the frame 1.

The platens 43 are spaced from each other by tubular spacing blocks 46 encasing tie rods 47 in a manner similar to that for connecting the frame units.

The pivotal links 44 and 45 are of similar lengths so that a parallel motion is imparted to the platens during the rocking of the same. The lower ends of the links 44 and the upper ends of the links 45 are provided with journal openings 48 for receiving pivotal pins 49 and 50 which are retained in recesses 51 and 52 of the frames and platens respectively by wedges 53 and 54. By removing the wedges and disconnecting the actuating mechanism from the platens, the same may be readily removed and replaced. The upper ends of the links 44 and the lower ends of the links 45 are journaled to the platens and frames respectively within the journal boxes 55 and 56.

A longitudinally extending electrode-supporting bracket 57 is suitably secured to the inner face of the platens 43. A movable electrode 58, of a construction similar to the stationary electrode, is secured to the electrode-supporting bracket 57 in any suitable manner, as shown in Fig. 2.

The movable electrode 58 is provided with flexible conductors 59 which connect the same to the pole of the transformers 37 opposite of that to which the conductors 39 are secured. It has been found desirable to provide insulating means between the electrode supporting brackets 57 and the platens 43.

The platens 43 are longitudinally spanned by a plate 60 which is secured to the platens by bolts 61, as is shown in Fig. 2. The bolts 61 preferably extend from the electrode supporting bracket through the plate 60.

A movable clamping jaw 62 of a construction similar to the stationary clamping jaw is secured to the inner faces of the movable platens 43 below the electrode-supporting bracket.

The links 45 are provided intermediate the ends thereof with journal brackets 63 in which are pivotally secured the outer ends of the transversely extending links 64 which have the inner ends thereof pivotally connected to brackets 65 on the carriage 15 so that a rocking movement of the links 45 will cause a horizontal movement of the carriage.

As shown in Fig. 2, the brackets 63 are secured to the middle of the links 45 so that the horizontal movement of the carriage will be half the movement of the auxiliary frame supporting the electrode and clamping jaw. As a result, the backing pressures against the electrodes will be opposite the electrode pressures throughout the entire movement of the edges during the flashing operation and the pressures will thus be desirably balanced and reduce the tendency of the walls of the blank to slip relative to the electrodes.

The plate 8 is provided with set screws 66 adapted to engage the journal boxes 56 of the links 45 to fix the plate 8 in abutment with legs 5.

Any suitable mechanism may be provided for actuating the platens to effect the desired movement of the clamping jaw and electrode. As shown in the drawings, the actuating mechanism broadly comprises threaded pinions operatively connected to the platens and rotated by movable racks actuated by fluid pressure cylinders.

Supported upon the upper wall of the legs 4 of the frame members is a longitudinally extending rack housing 67, as shown in Fig. 2. The rack housing comprises a bed plate 68, suitably secured to the legs 4 of the frame members, spaced vertical side plates 69 and 70 and a cover plate 71.

The side plates 69 and 70 are provided with a plurality of spaced central openings 72 and 73 through which extend the opposite ends of the threaded pinions 74. The pinions 74 are provided on their medial circumference with gear teeth 75 adapted to engage longitudinally extending gear racks 76 and 77 which slide longitudinally within the gear housing 67.

As shown in Fig. 5, the ends of the gear racks are provided with couplings 78 and 79 for connecting the same to piston rods 80 and 81 which latter are connected to pistons 82 and 83 operating within suitable fluid pressure cylinders 84 and 85 at one end of the machine.

Extending rearwardly from the pistons 82 and 83 are guide rods 86 and 87 which extend through the outer end walls of the cylinder. The piston rods are provided with adjustable collars 88 and 89 respectively for limiting the stroke of the piston and the resultant rocking movement of movable platens 43.

The pinions 74 are provided with right and left hand threads 90 and 91 which engage transversely extending threaded pins 92 and drive rods 93. The pins 92 are rigidly secured to the frames by passing the same through blocks 94 and 95 which are clamped on opposite sides of upstanding portions 96 of the legs 4 by bolts 97. The pins 92 are provided with shoulders 98 adjacent the inner threaded ends thereof which engage the inner walls of the blocks 94. The outer ends of the pins are provided with threads for receiving nuts for locking the pins in position. The pins are prevented from rotation in any suitable manner.

The drive rods 93 are provided intermediate their ends with collars 99 forming shoulders which are received within recesses 100 in the plate 60 on the movable platens 43. The outer ends of the drive rods are provided with threads 101 engaging the nuts 102 which securely clamp the drive rods to the movable platens and prevent rotation of the rods.

The links 44 and 45 are of substantial length and are adapted to rock slightly on each side of the vertical position so that the vertical component of the rocking motion is negligible in comparison to the horizontal component of movement during the operation of the machine and no positive means need be provided for compensating the driving mechanism for the vertical component of motion. This slight movement may be taken up in the actuating members.

As a further embodiment of the invention, the machine is provided with an arbor which is adapted to be enclosed within the tubular blank and provide a backing support for the electrode pressures.

The arbor has a base 103 of any suitable material having a curved lower face 104 on which is secured a shoe 105 for engaging the inner bottom wall of the tubular blank.

Extending outwardly from each side of the base 103 and suitably secured to the same are angle irons 106 and 107 which, together with the base, support a pair of longitudinally extending spaced plates 108 and 109. Between the plates 108 and 109 are a plurality of laminations 110 of soft iron sheets which provide an impedance against the flow of the welding current around the back of the tube blank and aid in maintaining more uniform welding conditions by helping to adjust the flow of current in the various longitudinal sections of the blank.

The plate 109 has a medial longitudinally extending raised portion 111 having a depression 120 in the upper surface thereof in which rests the hinge connection 113 of upwardly extending pivotal arms 114 and 115. The pivotal point of the arms 114 and 115 is preferably located immediately above the center of the blank as shown in Fig. 2 so as to insure a maximum stability of the pivotal arms relative to the walls of the blank. The upper ends of the arms 114 and 115 are provided with liners 116 and 117 adapted to engage the inner walls of the tubular blank directly opposite the electrode contacts. The pivotal arms 114 and 115 extend longitudinally of the machine and are preferably built in sections, as shown in Fig. 6.

Each section is provided with outwardly extending brackets 118 and 119 having slots 120' and 121 for receiving upwardly extending guide posts 122 and 123 secured to the plate 109.

The guide posts are provided with nuts on their upper ends and have backing springs 124 and 125 to resist the inward movement of the arms 114 and 115.

The brackets 118 and 119 are further provided with spring stops 126 and 127 for resisting the outward movement of the arms 114 and 115.

The arbor is loosely supported at the feed end of the machine by a plate 128 connected to the machine and adapted to pass between the edges of the blank when the latter is inserted into the welding machine.

Supported within the recess formed by the outwardly bowed portions of the pivotal arms is a removable trough 129 adapted to collect metal flashed from the edges during the welding operation.

The operation of the device may be briefly described as follows:

A tubular blank 18, formed in any desired manner and having longitudinal edges to be welded, is placed upon the lower supporting plate 17, the movable clamping jaw and electrode being meanwhile advanced to a predetermined forward position. Partial fluid pressure is then applied to the flexible tubes 9 which raises the blank into contact with the electrode, after which fluid pressure is admitted to the flexible tubes 31 within the clamping jaws, causing an advancement of the pins 28 within the clamping bars 27 and forcing the edges of the tubular blank into contact with each other to bring the same into longitudinal alignment.

Final pressure is then applied to the flexible tubes 9 which forces the edges firmly against the electrodes and brings the edges into transverse alignment. It has been found desirable to provide sufficient final fluid pressure within the flexible tubes 9 so that pressure within the flexible tube 31 may be withdrawn and the movable electrode operated to move the edges relative to each other without relative slipping between the contacting surface of the blank and the electrode.

The final pressure within the flexible tubes is preferably maintained constant throughout the welding operation and above a predetermined minimum sufficient to withstand the final bumping pressure of the clamping jaws for forcing the heated edges together to complete the weld.

As before mentioned, the fluid within the flexible tubes 9 provides a resilient support for the tubular blank and a resultant substantially constant pressure between the electrodes and the wall of the tubular blank. This tends to prevent slippage of the electrode contacts while the edges are being moved during the flashing operation.

The platens 43 are then actuated by regulating the fluid flow into the hydraulic cylinders 84 and 85 to withdraw the movable electrode and cause resultant separation of the edges to be welded. It should be noted that when the edges are in a separated condition, preparatory for the welding operation, the clamping jaws are not in contact with the side walls of the blank and that the tubular blank is suspended between the electrodes and the lower support and relative movement of the edges necessary to the flash welding operation is effected by the frictional engagement of the walls of the tubular blank with the movable electrode.

The platens 43 are then actuated by the power cylinders 84 and 85 to move the electrode 58 and cause the edges to approach each other and an electric welding current of desired magnitude and characteristics is applied to the edges through the electrodes. An electric arc is preferably established between the edges by slowly feeding the edges toward each other until certain small portions thereof are in contact with each other. The contacting points are immediately fused and flashed off and the arc is established at such points. Movement of the edges toward each other is continued until successive points along the same have been flashed off and an arc is established for the full length of the edges.

Although the above is considered the preferred method of establishing an arc, it is understood that other methods may be employed, for example, the current may be applied to the edges before the same are separated.

After the arc is established, the edges are advanced toward each other at a speed necessary to maintain an arc of desired length until a predetermined amount of metal has been flashed from the edges and the metal at the same time has been brought to a plastic welding condition. Meanwhile, the forward feeding movement of the platens has caused the clamping jaws to slowly approach the walls of the tubular blank. The machine is so adjusted for each size blank that when the edges have been brought to a final welding temperature, the clamping jaws will be in contact with the walls of the tubular blank and substantially confine the same.

It may be well to explain at this point that, although the movable clamping jaw advances at the same speed and in the same direction as the movable electrode, and consequently at the same speed and direction as the top edge portion of the blank clamped to the movable electrode, the bottom wall of the blank moves in the direction of movement of the clamping jaw at half the speed of the top edge portion of the blank, and since the clamping jaw is located between the bottom and top edge portions of the blank there will be an overtaking movement of the clamping jaw relative to the adjacent side wall of the blank. By permitting the blank support to move in the manner described, the opposite side wall of the blank will engage the stationary clamping jaw substantially simultaneously. Furthermore, the clamping jaws will engage the side walls of the blank only after a predetermined relative movement of the edge portions of the blank, or in other words, only after a predetermined heating or flashing of the edges of the blank.

The machine is first adjusted for each size blank by the insertion and removal of shims from behind the clamping jaws so that when the edges have been heated for a period sufficient to bring them to the desired welding temperature, the clamping jaws will be in initial contact with the opposite side walls of the blank. Sufficient fluid pressure is then applied to the operating cylinders 84 and 85 to rapidly force the edges together under considerable pressure whereby a portion of the plastic metal is extruded from the edges and an integrally welded seam of uniform quality is effected.

Such construction insures that after the first adjustment all the subsequent blanks will be heated for substantially the same period of time, thus effecting welded products which are of uniform character. For extremely thin walled stock, the clamping jaws for upsetting the edges may be omitted and the electrodes may be operated to cause the upsetting.

During the final operation of pressing the heated edges together, the blank is confined substantially throughout its entire circumference by the clamping jaws, the support and the electrodes so that the blank will be firmly held in position during the application of the upsetting or bumping pressure.

As before briefly mentioned, it has been found desirable to effect a horizontal movement of the blank support and to synchronize such movement with the electrode movement to insure that the opposing electrode pressures will be opposite the electrodes throughout the entire movement of the latter during the flashing operation and prevent unbalancing of pressures and a consequent slipping of electrode contacts.

Machines embodying the invention have found a successful and practical application in the manufacture of pipe sections employed in pipe lines for the transportation of oil, gas and other fluids under pressure.

Some conception of the difficulties incident to the flash welding of pipe sections may be gathered from consideration that an electric arc of uniform characteristics must be maintained for the full length of the pipe to insure a uniform heating of the edges necessary to effect a desirable weld.

It has been found feasible for commercial production to manufacture from plate ⅛ to ⅞ of an inch in thickness pipe lengths ranging from twenty to forty feet and of diameters as large as thirty inches. When the market demands larger pipe, machines constructed in accordance with our invention may be built for manufacturing it. Having in mind the character of the work, the practical difficulties involved in maintaining an electric arc of proper characteristics between the edges of a long tubular blank having relatively thick walls will be readily appreciated.

Having thus described in detail the construction of the preferred embodiment of the machine, it is understood that the invention is not limited thereto but that departures in the construction thereof may be made within the spirit of the invention as defined in the appended claims.

We claim:

1. A welding apparatus for use in the manufacture of a tubular article having a longitudinal weld, comprising means for bringing the edges to be welded into accurate alignment, means for establishing and maintaining an electric arc between the edges for the full length thereof to bring the same to a welding temperature, and means for pressing the heated edges together to effect the weld.

2. A welding apparatus for use in the manufacture of a tubular article having a longitudinal weld, comprising means for bringing the edges to be welded into accurate alignment, means for applying an electric current to said edges, means for moving said edges relative to each other to establish and maintain an electric arc between the edges for the full length of the same and to thereby bring the metal at the edges to a welding temperature, and means for pressing the heated edges together to complete the weld.

3. A welding apparatus for use in the manufacture of a tubular article having a longitudinal weld, comprising a plurality of welding electrodes, means for supporting the walls adjacent the edges to be welded in contact with the electrodes, means for supplying an electric welding current to said electrodes, means for moving the edges relative to each other to establish and maintain an electric arc between the same for the full length thereof to heat the metal adjacent the edges to a welding temperature, and means for pressing said edges together to complete the weld.

4. A welding apparatus for use in the manufacture of a tubular article having a longitudinal weld, comprising a plurality of welding electrodes adapted to contact with the wall of the tubular article adjacent the edges to be welded, yieldable means for supporting the walls of the tubular article in effective electrical contact with the electrodes, means for moving the edges relative to each other to establish and maintain an electric arc between the edges for the full length thereof to heat the same to a welding temperature, and means for pressing the heated edges together to complete the weld.

5. A welding apparatus for use in the manufacture of a tubular article having a longitudinal weld, comprising cooperating welding electrodes adapted to contact with the walls of the tubular article adjacent the edges to be welded, means for bringing the edges to be welded into accurate alignment, means for yieldably supporting the walls of the tubular article in uniform contact with the electrodes for the full length thereof, means for moving said edges relative to each other to establish and maintain an electric arc for the full length of the edges to heat the same to a welding temperature, and means for pressing the heated edges together to complete the weld.

6. A welding apparatus for use in the manufacture of a tubular article having a longitudinal weld, comprising cooperating welding electrodes adapted to contact with the walls of the tubular article adjacent the edges to be welded for the full length thereof, means for providing a frictional electrical contact between the walls of the tubular blank and the electrodes whereby movement of the electrodes will effect a resultant movement of the edges, means for moving the electrodes relative to each other whereby the resultant movement of the edges will establish and maintain an electric arc between the edges for the full length thereof to heat the same to a welding temperature, and means for pressing the heated edges together to complete the weld.

7. A welding apparatus for use in the manufacture of a tubular article having a longitudinal weld, comprising cooperating welding electrodes extending longitudinally of the tubular article and adapted to engage the walls of the same adjacent the edges to be welded, yieldable means for clamping the electrodes to the walls of the tubular article whereby movement of the electrodes will effect a resultant similar movement of the edges to be welded, means for applying an electric welding current to the electrodes, means for moving the edges relative to each other to establish and maintain an electric arc between the edges for the full length thereof to heat the same to a welding temperature, and means for pressing the heated edges together to complete the weld.

8. A welding apparatus for use in the manufacture of a tubular article having a longitudinal weld, comprising welding electrodes extending longitudinally of the tubular article adjacent the edges to be welded, a floating support engaging the outer walls of the tubular article opposite the electrodes, means for clamping the tubular article between the electrodes and support, means for moving the edges relative to each other to establish and maintain an electric arc between the edges for the full length thereof to heat the same to a welding temperature, and means for pressing the heated edges together.

9. A welding apparatus for use in the manufacture of a tubular article having a longitudinal weld, comprising electrodes extending longitudinally of the blank and adapted to contact with the walls of the same adjacent the edges to be welded, a support engaging the outer walls of the blank opposite the electrodes, means for yieldably clamping the blank between the electrodes and the support, means for moving the edges relative to each other to establish and maintain an electric arc between the edges for the full length thereof to heat the same to a welding temperature, and means for pressing the heated edges together.

10. An apparatus for welding a longitudinal seam in a tubular blank, comprising welding electrodes extending longitudinally on each side of the welding cleft and adapted to contact with the walls of the tubular blank adjacent the edges to be welded, a support for the tubular blank oppositely disposed from the electrodes, an arbor disposed within the tubular blank, means for yieldably clamping the tubular blank between the electrodes and the support, means for moving the edges relative to each other to establish and maintain an electric arc between the edges for the full length thereof to heat the same to a welding temperature, and means for pressing the heated edges together.

11. An apparatus for welding a longitudinal seam in a tubular article, comprising welding electrodes extending longitudinally of the tubular article on each side of the welding cleft and adapted to contact with the walls of the tubular article adjacent the edges to be welded, a support for the tubular article oppositely disposed from the electrodes, an arbor disposed within the tubular article, said arbor having pivotal contacting members adapted to engage the inner walls of the tubular article opposite the electrode contacts, means for yieldably clamping the tubular article between the electrodes and the support, means for moving the edges relative to each other to establish and maintain an electric arc between the same for the full length thereof to heat the edges to a welding temperature, and means for pressing the heated edges together.

12. An apparatus for welding a longitudinal seam in a tubular blank, comprising welding electrodes extending longitudinally of the tubular blank on each side of the welding cleft and adapted to contact with the walls of the blank adjacent the edges to be welded, a floating support for the tubular blank oppositely disposed from the electrodes, means for yieldably clamping the tubular blank between the electrodes and the support, an arbor disposed within the tubular blank, said arbor having soft iron laminations incorporated therein, means for moving the edges relative to each other to establish and maintain an electric arc between the edges for the full length thereof to heat the same to a welding temperature, and means for pressing the heated edges together.

13. An apparatus for welding a longitudinal seam in a tubular blank, comprising welding electrodes extending longitudinally of the tubular blank on each side of the welding cleft and adapted to contact with the walls of the tubular blank adjacent the edges to be welded, a floating support for the tubular blank oppositely disposed from the electrodes, means for yieldably clamping the tubular blank between the electrodes and the support, means for moving the edges relative to each other to establish and maintain an electric arc between the edges for the full length thereof to heat the same to a welding temperature, and means for pressing the heated edges together.

14. An apparatus for welding a longitudinal seam in a tubular blank, comprising welding electrodes extending longitudinally of the tubular blank on opposite sides of the welding cleft and adapted to engage the walls of the tubular blank adjacent the edges to be welded, a support for the tubular blank oppositely disposed from the electrodes, means for resiliently clamping the tubular blank between the electrodes and the support, an arbor disposed within the tubular blank, said arbor having pivotally contacting members engaging the inner walls of the tubular blank opposite the electrode contacts, soft iron laminations incorporated in said arbor, means for moving the edges relative to each other to establish and maintain an electric arc between the edges for the full length thereof to heat the same to a welding temperature, and means for pressing the heated edges together.

15. An apparatus for welding a longitudinal seam in a tubular blank, comprising welding electrodes extending longitudinally of the blank on opposite sides of the welding cleft and adapted to engage the walls of the tubular blank adjacent the edges to be welded, a support engaging the outer walls of the tubular blank opposite the electrodes, means for clamping the tubular blank between the electrodes and the support, means for moving the edges relative to each other to establish and maintain an electric arc between the edges for the full length thereof to heat the same to a welding temperature, and oppositely disposed clamping jaws for pressing the heated edges together.

16. An apparatus for welding a longitudinal seam in a tubular blank, comprising cooperating welding electrodes extending longitudinally of the blank on opposite sides of the welding cleft and adapted to engage the walls of the tubular blank adjacent the edges to be welded, a support for the tubular blank oppositely disposed from the electrodes, means for clamping the tubular blank between the electrodes and the support, means for moving the edges relative to each other to establish and maintain an electric arc between the edges for the full length thereof to heat the same to a welding temperature, clamping jaws for pressing the heated edges together, and independently operable means within the clamping jaws for initially forcing the edges into alignment.

17. An apparatus for welding a longitudinal seam in a tubular blank, comprising cooperating welding electrodes extending longitudinally of the blank on opposite sides of the welding cleft and adapted to engage the walls of the tubular blank adjacent the edges to be welded, a support for the tubular blank oppositely disposed from the electrodes, means for clamping the tubular blank between the electrodes and the support, means for moving the edges relative to each other to establish and maintain an electric arc between the edges for the full length thereof to heat the same to a welding temperature, and clamping jaws for pressing the heated edges together, one of the clamping jaws having independently operable means adapted to engage opposite side walls of the tubular blank to force the edges to be welded into initial alignment.

18. An apparatus for welding a longitudinal seam in a tubular blank, comprising welding electrodes extending longitudinally of the tubular blank on opposite sides of the welding cleft, a support for the tubular blank opposite the electrodes, means for yieldably clamping the tubular blank between the electrodes and the support, independently operable contact members adapted to engage opposite side walls of the tubular blank to bring the edges into initial alignment, means for moving the edges relative to each other to establish and maintain an electric arc between the edges to heat the same to a welding temperature, oppositely disposed clamping jaws, and means for operating the clamping jaws to force the heated edges together.

19. An apparatus for welding a longitudinal seam in a tubular blank, comprising welding electrodes extending longitudinally of the tubular blank on opposite sides of the welding cleft, a support engaging the outer walls of the tubular blank opposite the electrodes, clamping jaws adapted to engage opposite side walls of the tubular blank, and means for effecting relative movement of the electrodes and of the clamping jaws.

20. An apparatus for flash welding a longitudinal seam in a tubular blank, comprising welding electrodes extending longitudinally of the tubular blank and disposed on opposite sides of the welding cleft, a support for the tubular blank opposite the electrodes, means for yieldably supporting the tubular blank between the electrodes and the support, clamping jaws adapted to engage opposite walls of the tubular blank, and means for effecting relative movement of the electrodes and of the clamping jaws.

21. An apparatus for flash welding a longitudinal seam in a tubular blank, comprising welding electrodes extending longitudinally of the tubular blank on opposite sides of the welding cleft, a support for the tubular blank opposite the electrodes, means for clamping the tubular blank between the electrodes and the support, clamping jaws adapted to engage the opposite side walls of the tubular blank, and means for effecting relative movement of the electrodes and the clamping jaws, said last named means including a plurality of spaced parallel pinions.

22. An apparatus for welding a longitudinal seam in a tubular blank, comprising welding electrodes extending longitudinally of the blank on opposite sides of the welding cleft, a support for the blank opposite the electrodes, means for clamping the tubular blank between the electrodes and the support, clamping jaws adapted to engage opposite side walls of the tubular blank, a plurality of platens for supporting one of the electrodes and clamping jaws, and means for moving the platens to effect resultant movement of the edges.

23. In an apparatus for flash welding a longitudinal seam in a tubular article, welding electrodes extending longitudinally of the article on opposite sides of the welding cleft, a support for the tubular article oppositely disposed from the electrodes, means for clamping the tubular blank between the electrodes and support, a plurality of platens for supporting one of said electrodes, and means for moving the platens.

24. In an apparatus for flash welding a longitudinal seam in a tubular article, electrodes extending longitudinally of the article on opposite sides of the welding cleft, a support for the tubular article oppositely disposed from the electrodes, means for yieldably clamping the tubular blank between the electrodes and the support, a plurality of platens for supporting one of said electrodes, and means for simultaneously moving the platens.

25. A welding apparatus for use in manufacturing a tubular article having a longitudinal weld, comprising electrodes extending longitudinally of the blank to be welded on opposite sides of the welding cleft, a support for the tubular article oppositely disposed from the electrodes, a plurality of platens for supporting one of said electrodes, and means for simultaneously moving all of said platens, said last named means including a plurality of longitudinally spaced transversely movable members, a longitudinally extending member operatively connected to said transversely movable members, and means for upsetting the heated edges of the blank.

26. A welding apparatus for use in manufacturing a tubular article having a longitudinal weld, comprising electrodes extending longitudinally of the blank to be welded on opposite sides of the welding cleft, a support for the blank opposite the electrodes, means for clamping the tubular blank between the electrode and support, a plurality of longitudinally spaced platens supporting one of the electrodes, pivotal supporting arms for the platens, means for rocking the platens on said arms, and means upsetting the heated edges.

27. A welding apparatus for use in manufacturing a tubular article having a longitudinal weld, comprising electrodes extending longitudinally of the blank to be welded on opposite sides of the welding cleft, a support for the blank opposite the electrodes, means for clamping the tubular blank between the electrode and support, a plurality of longitudinally spaced platens supporting one of the electrodes, pivotal supporting arms for the platens, means for rocking the platens on said arms, said last named means including a plurality of transversely movable members and a longitudinally movable member operatively connected thereto, and means upsetting the heated edges.

28. A welding apparatus for use in the manufacture of a tubular article having a longitudinal weld, comprising electrodes extending longitudinally of the blank to be welded on opposite sides of the welding cleft, a support engaging the outer walls of the tubular blank opposite the electrodes, means for clamping the blank between the electrodes and the support, means for effecting a relative movement of the electrodes toward and away from each other to establish and maintain an electric arc between the edges to heat the same to a welding temperature, said last named means including a longitudinally movable member and a plurality of transversely movable members, and means for pressing the heated edges together to complete the weld.

29. A welding apparatus for use in manufacturing a tubular article having a longitudinal weld, comprising electrodes extending longitudinally of the blank to be welded and adapted to engage the walls thereof on opposite sides of the cleft to be welded, a support for the blank opposite the electrodes, a movable frame for supporting one of the electrodes, a plurality of transversely spaced rows of arms pivotally supporting the frame, means for rocking the arms, and means for upsetting the heated edges.

30. A welding apparatus for use in manufacturing a tubular article having a longitudinal weld, comprising electrodes extending longitudinally of the blank to be welded and adapted to engage the walls thereof on opposite sides of the cleft to be welded, a support for the blank opposite the electrodes, a movable frame for supporting one of the electrodes, a plurality of transversely spaced rows of arms pivotally supporting the frame, means for rocking the arms, said last named means including a plurality of transversely movable members connected to said frame and a longitudinally movable member for operating said transversely movable members, and means for upsetting the heated edges.

31. In an apparatus for flash welding a longitudinal seam in a tubular article, electrodes extending longitudinally of the tubular article on opposite sides of the welding cleft, a support for the tubular article oppositely disposed from the electrodes, means for clamping the tubular blank between the electrodes and the support, a plurality of platens for supporting one of the electrodes, means for effecting a movement of the platens, said last named means including a drive rod for each of said platens, and means for operating the drive rods.

32. In an apparatus for flash welding a longitudinal seam in a tubular article, electrodes extending longitudinally of the article on opposite sides of the welding cleft, a support for the tubular article oppositely disposed from the electrodes, means for clamping the tubular article between the electrode and the support, a plurality of platens for supporting one of said electrodes, a plurality of pinions operatively connected to said platens, a longitudinally extending rack bar in intermeshing engagement with the pinions, and means for effecting a longitudinal movement of the rack bar.

33. In an apparatus for flash welding a longitudinal seam in a tubular article, electrodes extending longitudinally of the article on opposite sides of the welding cleft, a support for the tubular article oppositely disposed from the electrodes, means for clamping the tubular article between the electrode and support, a plurality of aligned movable platens for supporting one of said electrodes, threaded pinions operatively connected to the platens, longitudinally extending rack bars on opposite sides of the pinions and in intermeshing engagement therewith, and means for effecting a relative longitudinal sliding movement of the rack bars.

34. In an apparatus for flash welding a longitudinal seam in a tubular article, electrodes extending longitudinally of the article for the full length thereof on opposite sides of the welding cleft, a support for the tubular article oppositely disposed from the electrodes, means for clamping the tubular article between the electrode and support, a movable frame for supporting one of the electrodes, threaded pinions operatively connected to the movable frame, a longitudinal rack bar in intermeshing engagement with the pinions, means for effecting a longitudinal movement of the rack bar, and means for pressing the heated edges together.

35. An apparatus for welding a longitudinal seam in a tubular blank, comprising a stationary welding electrode extending longitudinally of the tubular blank, and adapted to engage the walls thereof adjacent one of the edges to be welded, a movable welding electrode extending longitudinally of the tubular blank and adapted to engage the walls of the same adjacent the opposite edge to be welded, a support engaging the outer walls of the tubular blank opposite the electrodes, means for effecting a relative movement of the edges to establish and maintain an electric arc between the edges to heat the same to a welding temperature, means for yieldably suspending the tubular blank between the electrodes and the support during the movement of the edges, and means for pressing the heated edges together to complete the weld.

36. An apparatus for welding a longitudinal seam in a tubular blank, comprising a stationary electrode extending longitudinally of the tubular blank and adapted to engage the walls thereof adjacent one of the edges to be welded, a movable welding electrode adapted to engage the walls of the tubular blank adjacent the opposite edge to be welded, a yieldable support engaging the outer walls of the tubular blank opposite the electrodes, means for suspending the tubular blank between the electrodes and the support, means for effecting relative movement of the edges to establish and maintain an electric arc between the same for the full length thereof to heat the edges to a welding temperature, and means for pressing the heated edges together to complete the weld.

37. A welding apparatus for use in the manufacture of a tubular article having a longitudinal weld, comprising welding electrodes extending longitudinally of the blank and adapted to engage the walls thereof on opposite sides of the welding cleft, a support engaging the outer wall of the blank opposite the electrodes, means for effecting a relative movement of the edges to establish and maintain an electric arc between the edges to heat the same to a welding temperature, means for effecting a resilient yieldable contact between the electrodes and the blank during the movement of the edges, and means for pressing the heated edges together to complete the weld.

38. An apparatus for welding a longitudinal seam in a tubular article, comprising a stationary welding electrode extending longitudinally of the tubular article and adapted to engage the walls thereof adjacent one of the edges to be welded, a movable welding electrode adapted to engage the walls of the article adjacent the opposite edge to be welded, an expansible support engaging the outer wall of the tubular blank opposite the electrodes, means for clamping the tubular blank between the electrodes and support, means for moving the last named electrode to effect a resultant relative movement of the edges and establish and maintain an electric arc between the edges for the full length thereof to heat the edges to a welding temperature, and means for pressing the heated edges together to complete the weld.

39. An apparatus for welding a longitudinal seam in a tubular blank, comprising a stationary welding electrode extending longitudinally of the tubular blank and adapted to engage the walls thereof adjacent one of the edges to be welded, a movable welding electrode adapted to engage the walls of the tubular blank adjacent the opposite edge to be welded, a support for the tubular blank oppositely disposed from the electrodes, means for clamping the tubular blank between the electrodes and the support, a supporting arbor within the tubular blank, means for moving one edge relative to the other to establish and maintain an electric arc between the edges for the full length thereof to heat the same to a welding temperature and means for pressing the heated edges together to complete the weld.

40. An apparatus for welding a longitudinal seam in a tubular blank, comprising a stationary welding electrode extending longitudinally of the tubular blank and adapted to engage the walls thereof adjacent one of the edges to be welded, a movable welding electrode extending longitudinally of the tubular blank and adapted to engage the walls thereof adjacent the opposite edge to be welded, a floating expansible support for the tubular blank oppositely disposed from the electrodes, a supporting arbor within the tubular blank, means for clamping the tubular blank between the electrodes and the support, means for moving the last named electrode to establish and maintain an electric arc between the edges for the full length thereof to heat the same to a welding temperature, and means for pressing the heated edges together to complete the weld.

41. An apparatus for welding a longitudinal seam in a tubular blank, comprising a stationary welding electrode extending longitudinally of the tubular blank and adapted to engage the walls thereof adjacent one of the edges to be welded, a movable welding electrode extending longitudinally of the tubular blank and adapted to engage the walls thereof adjacent the opposite edge to be welded, a floating expansible support for the tubular blank oppositely disposed from the electrodes, an arbor within the tubular blank, pivotal supporting arms within the arbor adapted to engage the walls of the tubular blank opposite the electrodes, means for clamping the tubular blank between the electrodes and the support, means for causing a relative movement of the edges toward and away from each other to establish and maintain an electric arc between the same for the full length thereof to heat the edges to a welding temperature, and means for pressing the heated edges together to complete the weld.

42. An apparatus for welding a longitudinal seam in a tubular blank, comprising a stationary welding electrode extending longitudinally of the tubular blank and adapted to engage the walls thereof adjacent one of the edges to be welded, a movable welding electrode extending longitudinally of the tubular blank and adapted to engage the walls thereof adjacent the opposite edge to be welded, a movable support for the tubular blank, means for resiliently clamping the tubular blank between the electrodes and the support, means for moving the last named electrode to establish and maintain an electric arc between the edges for the full length thereof to heat the same to a welding temperature, means for effecting a predetermined movement of the blank support in the direction of the electrode movement, and means for pressing the heated edges together to complete the weld.

43. A welding apparatus for use in the manufacture of a tubular article having a longitudinal weld, comprising electrodes extending longitudinally of the blank to be welded and engaging the walls thereof on opposite sides of the welding cleft, a support engaging the outer walls of the blank opposite the electrodes, means for effecting a relative movement of the electrodes to establish and maintain an electric arc between the edges for the full length thereof to heat the same to a welding temperature, means for effecting a simultaneous predetermined transverse movement of the support, and means for pressing the heated edges together to complete the weld.

44. A welding apparatus for use in the manufacture of a tubular article having a longitudinal weld, comprising a stationary electrode and a movable electrode adapted to engage the walls of the blank to be welded on opposite sides of the welding cleft, a support engaging the outer walls of the blank opposite the electrodes, means for clamping the blank between the electrodes and the support, means for effecting a transverse movement of the last named electrode to establish and maintain an electric arc between the edges for the full length thereof to heat the same to a welding temperature, means for effecting a predetermined synchronized transverse movement of the support, and means for pressing the heated edges together to complete the weld.

45. A welding apparatus for use in the manufacture of a tubular article having a longitudinal weld, comprising a stationary electrode adapted to engage the walls of the blank adjacent one of the edges to be welded, a movable electrode extending longitudinally of the tubular blank and adapted to engage the wall thereof adjacent the opposite welding edge, a support engaging the outer wall of the blank opposite the electrodes, means for yieldably suspending the blank between the electrodes and the support, means for moving said last named electrode relatively toward and away from said first named electrode to establish and maintain an electric arc between the edges to heat the same to a welding temperature, means for effecting a simultaneous predetermined transverse movement of the support in the direction of the electrode movement, and means for pressing the heated edges together.

46. A welding apparatus for use in the manufacture of a tubular article having a longitudinal weld, comprising a stationary electrode extending longitudinally of the blank to be welded and adapted to engage the walls thereof adjacent one of the welding edges, a movable electrode extending longitudinally of the blank and adapted to engage the walls thereof adjacent the opposite welding edge, a support engaging the outer walls of the blank opposite the electrodes, means for clamping the tubular blank between the electrodes and the support, means for moving the last named electrode relatively toward and away from the first named electrode to establish and maintain an electric arc between the edges to heat the same to a welding temperature, means for effecting a predetermined simultaneous transverse movement of the support at approximately half the speed of the electrode and in the same direction thereof, and means for pressing the heated edges together to complete the weld.

47. A welding apparatus for use in the manufacture of a tubular article having a longitudinal weld, comprising a stationary frame extending longitudinally of the blank to be welded for the full length thereof, an electrode rigidly secured to said frame and adapted to engage the walls of the blank adjacent one of the edges to be welded, a support for the blank resiliently secured to the frame, an auxiliary frame movably supported on the first mentioned frame, a second electrode secured to said auxiliary frame and adapted to engage the wall of the blank adjacent the opposite edge to be welded, means for moving said auxiliary frame to effect a relative movement of the electrodes toward and away from each other to establish and maintain an electric arc between the edges to heat the same to a welding temperature, means for effecting a simultaneous predetermined transverse movement of the support in the same direction as the movement of the electrode, and cooperating clamping jaws secured to the stationary and auxiliary frames for pressing the heated edges together.

48. An apparatus for welding a longitudinal seam in a tubular blank, comprising a stationary welding electrode extending longitudinally of the tubular blank and adapted to engage the walls thereof adjacent one of the edges to be welded, a movable welding electrode extending longitudinally of the tubular blank and adapted to engage the walls thereof adjacent the opposite edge to be welded, a support engaging the outer walls of the tubular blank opposite the electrodes, resilient means for moving the support toward and away from the electrodes to clamp the tubular blank between the electrodes and the support, means for moving the last named electrode relatively toward and away from the first named electrode to establish and maintain an electric arc between the edges for the full length thereof to heat the same to a welding temperature, and means for pressing the heated edges together.

49. An apparatus for welding a longitudinal seam in a tubular article, comprising a stationary electrode adapted to engage the walls of the tubular blank adjacent one of the edges to be welded, a movable electrode extending longitudinally of the tubular blank and adapted to engage the walls of the tubular blank adjacent the opposite edge to be welded, a support engaging the outer wall of the tubular blank opposite the electrodes, means for resiliently clamping the tubular blank between the electrodes and the support, means for moving the last named electrode and the support to effect a resultant relative movement of the edges toward and away from each other to establish and maintain an electric arc for the full length of the edges to heat the same to a welding temperature, and means for pressing the heated edges together to complete the weld.

50. An apparatus for flash welding a longitudinal seam in a tubular article, comprising a stationary electrode adapted to engage the walls of the tubular article adjacent one of the edges to be welded, a stationary clamping jaw adapted to engage one side wall of the tubular blank, a movable electrode extending longitudinally of the tubular article and adapted to engage the wall of the tubular article adjacent the opposite edge to be welded, a movable clamping jaw adapted to engage the side wall of the tubular article opposite the first named clamping jaw, a support engaging the outer wall of the tubular blank opposite the electrodes, means for yieldably clamping the tubular blank between the electrode and the support, and means for causing a simultaneous movement of the last named electrode, clamping jaw and support to effect a relative movement of the edges toward and away from each other to establish and maintain an electric arc between the edges for the full length thereof to heat the same to a welding temperature and cause the clamping jaws to press the heated edges together.

51. An apparatus for welding a longitudinal seam in a tubular article, comprising an electrode extending longitudinally of the tubular blank and adapted to engage the walls thereof adjacent one of the edges to be welded, a clamping jaw adapted to engage a side wall of the tubular blank, a second electrode extending longitudinally of the tubular blank and engaging the walls thereof adjacent the opposite edge to be welded and a second clamping jaw adapted to engage the opposite side wall of the tubular blank, a movable support for the last named electrode and clamping jaw, a support engaging the outer wall of the tubular blank opposite the electrodes, means for resiliently clamping the tubular blank between the electrode and the support, and means for moving the support for the electrode and clamping jaw to effect a relative movement of the edges toward and away from each other to establish and maintain an electric arc between the edges for the full length thereof to heat the same to a welding temperature and for pressing the heated edges together to complete the weld.

52. An apparatus for welding a longitudinal seam in a tubular article, comprising an electrode extending longitudinally of the tubular blank and adapted to engage the walls thereof adjacent one of the edges to be welded, a clamping jaw extending longitudinally of the tubular blank and adapted to engage one side wall thereof, a second electrode extending longitudinally of the tubular blank and adapted to engage the walls thereof adjacent the opposite edge to be welded, a second clamping jaw extending longitudinally of the tubular blank and engaging the opposite side wall thereof, a support engaging the outer wall of the tubular blank opposite the electrodes, a resilient expansible means for effecting a relative movement of the blank support and the electrodes to clamp the tubular blank between the electrode and the support, a movable support for the last named electrode and the clamping jaw, means for moving the said last named support to effect a relative movement of the edges to establish and maintain an electric arc between the edges for the full length thereof to heat the same to a welding temperature and for pressing the heated edges together, and means connecting the movable support with the tubular blank support for effecting a relatively limited horizontal movement of the blank support.

53. An apparatus for flash welding a longitudinal seam in a tubular article, comprising an electrode extending longitudinally of the tubular blank and adapted to engage the walls thereof adjacent one of the edges to be welded, a clamping jaw extending longitudinally of the tubular blank and adapted to engage one side wall of the same, a second electrode extending longitudinally of the tubular blank and adapted to engage the wall thereof adjacent the opposite edge to be welded, a second clamping jaw extending longitudinally of the tubular blank and adapted to engage the opposite side wall of the same, a support engaging outer walls of the tubular blank opposite the electrodes, means for effecting a movement of the blank support toward and away from the electrodes to clamp the tubular blank between the electrodes and the support, a movable support for the last named electrode and clamping jaw, a link connecting said movable support with the tubular blank support, and means for operating said electrode and clamping jaw support for effecting a relative movement of the electrodes and of the clamping jaws.

54. An apparatus for welding a longitudinal seam in a tubular article, comprising an electrode adapted to engage the walls of the tubular blank adjacent one of the edges to be welded, a clamping jaw extending longitudinally of the tubular article and adapted to engage one side thereof, a second electrode extending longitudinally of the tubular article and engaging the wall thereof adjacent the opposite edge to be welded, a second clamping jaw extending longitudinally of the tubular article and adapted to engage the opposite side wall, a support for the tubular article oppositely disposed from the electrodes, means for expanding said support to clamp the tubular article between the electrodes and the support, a plurality of platens for supporting the last named electrode and clamping jaw, and means for effecting a movement of the platens.

55. An apparatus for flash welding a longitudinal seam in a tubular article, comprising an electrode extending longitudinally of the tubular article and adapted to engage the wall thereof adjacent one of the edges to be welded, a clamping jaw extending longitudinally of the tubular article and adapted to engage one side wall thereof, a support for the electrode and clamping jaw, a second electrode extending longitudinally of the tubular article and adapted to engage the wall of the adjacent opposite edge to be welded, a second clamping jaw extending longitudinally of the tubular article and engaging the opposite side wall thereof, a support for the tubular article oppositely disposed from the electrodes, resilient expansible means for clamping the tubular article between the electrodes and the support, a plurality of platens for supporting the last named electrode and clamping jaw, pivotal links for supporting the platens, means for connecting one of said links to the support for the tubular article, and means for effecting a rocking movement of the platens.

56. An apparatus for welding a longitudinal seam in a tubular article, comprising an electrode extending longitudinally of the tubular article and adapted to engage the wall of the same adjacent one of the edges to be welded, a clamping jaw extending longitudinally of the tubular article and adapted to engage one side wall of the same, a support for the electrode and clamping jaw, a second electrode extending longitudinally of the tubular article and engaging the wall thereof adjacent the opposite edge to be welded, a second clamping jaw extending longitudinally of the tubular article and adapted to engage the opposite side wall thereof, a support for the tubular article oppositely disposed from the electrodes, means for moving said support for resiliently clamping the tubular article between the electrodes and the support, a plurality of platens for supporting the second named electrode and clamping jaw, a pivotal support for the platens, means connecting the pivotal support with the support for the tubular blank, pinions operatively connected to the platens, rack bars engaging the pinions, and means for operating the rack bars for effecting a pivotal movement of the platens and a movement of the support for the tubular article.

57. In a welding apparatus for use in manufacturing a tubular article having a longitudinal seam, an arbor adapted to extend the full length of the article and support the walls of the same during the welding operation, said arbor comprising a base adapted to engage the inner wall of the tubular article opposite the welding cleft, and a plurality of pivotal arms adapted to contact with the inner walls of the tubular article adjacent the welding electrodes.

58. In an apparatus for welding a longitudinal seam in a tubular article, an arbor adapted to extend the full length of the article and support the walls of the same during the welding operation, said arbor comprising a base engaging the inner wall of the tubular article opposite the welding cleft, upstanding pivotal arms adapted to engage the inner walls of the tubular article adjacent the welding electrodes, and means for limiting the pivotal movement of the arms.

59. In an apparatus for welding a longitudinal seam in a tubular article, an arbor adapted to extend the full length of the article and support the walls of the same during the welding operation, said arbor comprising a base engaging the inner wall of the tubular article opposite the welding electrodes, pivotal arms adapted to engage the inner wall of the blank adjacent the electrodes, and a trough disposed between said arms for receiving the metal flashed from the edges during the welding operation.

60. In an apparatus for welding a longitudinal seam in a tubular article, an arbor for supporting the walls thereof during the welding operation, said arbor comprising a base adapted to engage the inner walls of the tubular article opposite the welding cleft, arms having ends thereof pivotally connected to said base and having the free ends thereof engaging the inner wall of the tubular blank adjacent the welding electrodes, and means incorporated in the arbor forming an impedance against the flow of the current around the back of the article.

61. In an apparatus for welding a longitudinal seam in a tubular article, an arbor for supporting the walls thereof during the welding operation, comprising a base adapted to engage the inner wall of the tubular article opposite the welding cleft, arms having the ends thereof pivotally connected to the base, contact blocks on the free ends thereof adapted to engage the inner walls of the tubular article opposite the welding electrodes, adjustable stops for limiting the pivotal movement of the arms in one direction, and spring pressed means resisting the movement of the arms in the opposite direction.

62. In an apparatus for welding a longitudinal seam in a tubular article, an arbor adapted to support the walls thereof during the welding operation, said arbor comprising a base engaging the inner wall of the tubular blank opposite the welding cleft, arms pivotally connected to the base and having the ends thereof adapted to engage the inner wall of the tubular article opposite the welding electrodes, means for limiting the pivotal movement of the arms in one direction, spring means for resisting the pivotal movement of the arms in the opposite direction, and means incorporated in the arbor for forming an impedance against the flow of the welding current around the back of the article.

63. An apparatus for welding a longitudinal seam in a tubular article, comprising a stationary frame, an extensible tubular blank support mounted on the frame, an electrode connected to the frame and adapted to extend longitudinally of the tubular blank and to engage the walls thereof adjacent one of the edges to be welded, a clamping jaw connected to the frame and adapted to extend longitudinally of the tubular blank and engage the side wall thereof, an auxiliary frame movably connected to the first named frame, an electrode supported by the auxiliary frame and adapted to extend longitudinally of the tubular article and engage the wall thereof adjacent the opposite edge to be welded, a clamping jaw supported by the auxiliary frame and adapted to engage the opposite side wall of the tubular article, and means for moving said auxiliary frame to effect a relative movement of the electrodes, clamping jaws, and welding edges toward and away from each other.

64. In a welding apparatus for use in manufacturing a tubular article having a longitudinal seam, an arbor extending the full length of the blank to be welded and adapted to support the walls thereof during the welding operation, said arbor comprising pivotal arms contacting with the inner walls of the blank opposite the welding electrode contacts, and means in said arbor for forming an impedance against the flow of current around the back of the blank.

65. An apparatus for welding a longitudinal seam in a tubular article, comprising a stationary frame, an electrode secured to the stationary frame and adapted to extend longitudinally of the tubular article and engage the walls thereof adjacent one of the edges to be welded, a longitudinally extending clamping jaw secured to the frame and adapted to engage the side wall of the tubular article, a floating support for the tubular article mounted on the frame and adapted to engage the walls of the tubular article opposite the welding cleft, transversely spaced vertically extending links pivotally connected to the frame, an auxiliary frame pivotally connected to the links, an electrode supported on said auxiliary frame and adapted to extend longitudinally of the tubular article and engage a wall of the same adjacent the opposite edge to be welded, a complementary clamping jaw supported on the auxiliary frame and adapted to engage the side wall of the tubular article opposite the first named clamping jaw, links connecting said first named links with the support for the tubular article, and means for effecting a rocking movement of the auxiliary frame on said vertical links to cause a relative movement of the electrodes and clamping jaws and a limited horizontal movement of the support for the tubular article.

66. An apparatus for welding a longitudinal seam in a tubular article, comprising a stationary frame adapted to extend longitudinally for the full length of the tubular article, a longitudinally extending electrode secured to the frame and adapted to engage the walls of the tubular article adjacent one of the edges to be welded, a longitudinally extending clamping member supported on the frame and adapted to engage one side wall of the tubular article, an extensible support for the tubular blank mounted on the frame and adapted to engage the wall of the tubular article opposite the welding cleft, an auxiliary frame rockably connected to the stationary frame, a longitudinally extending electrode supported on the auxiliary frame and engaging the wall of the tubular article adjacent the opposite edge to be welded, a complementary clamping member extending longitudinally of the tubular article and adapted to engage the side wall of the tubular article opposite the first named clamping member, and means for effecting a limited rocking movement of the auxiliary frame.

67. An apparatus for welding a longitudinal seam in a tubular article, comprising a stationary frame extending longitudinally of the tubular article for the full length thereof, said stationary frame including a plurality of longitudinally spaced U-shaped members extending transversely of the machine, a longitudinally extending electrode connected to said stationary frame and adapted to engage the wall of the tubular article adjacent one of the edges to be welded, a clamping jaw extending longitudinally of the frame and adapted to engage the side wall of the tubular article, a vertically extensible support for the tubular article adapted to engage the outer walls thereof opposite the welding cleft, an auxiliary frame rockably connected to the stationary frame, said auxiliary frame including a plurality of longitudinally spaced L-shaped platens, a longitudinally extending electrode supported on the auxiliary frame and adapted to engage the wall of the tubular article adjacent the opposite edge to be welded, a complementary clamping jaw supported on the auxiliary frame and adapted to engage the opposite side wall of the tubular article, means for effecting a limited rocking movement of the auxiliary frame, said means including pinions operatively connected to the auxiliary frame, rack bars meshing with said pinions on opposite sides thereof, fluid pressure for operating said rack bars, and means for limiting the movement of the rack bars.

68. A welding apparatus for use in the manufacture of a tubular article having a longitudinal weld, comprising a stationary frame extending longitudinally of the blank for the full length thereof, an electrode secured to said frame and adapted to engage the wall of the blank adjacent one of the welding edges, a longitudinally extending clamping jaw secured to the frame, a support for the tubular blank resiliently supported on said frame and adapted to engage the outer wall of the blank opposite the electrode, an auxiliary frame pivotally connected to the stationary frame, a longitudinally extending electrode secured to the auxiliary frame and adapted to engage the wall of the blank adjacent the opposite welding edge, a complementary clamping jaw secured to the auxiliary frame, means for causing a transverse movement of the auxiliary frame to effect a relative movement of the electrodes toward and away from each other to establish and maintain an electric arc between the edges to heat the same to a welding temperature, said last named means including a longitudinally movable member and a plurality of transversely movable parallel members operatively connected to the longitudinally movable member, and means for causing a simultaneous transverse predetermined movement of the support.

69. A welding apparatus for use in manufacturing a tubular article having a longitudinal seam, comprising welding electrodes extending longitudinally of the blank on opposite sides of the cleft to be welded, means for clamping the tubular blank to the electrodes, means for moving one of the electrodes to establish and maintain an electric arc between the edges to heat the same to a welding temperature, and means engaging the opposite side walls of the blank after a predetermined movement of the electrode to press the heated edges together.

70. A welding apparatus for use in manufacturing a tubular article having a longitudinal seam, comprising electrodes extending longitudinally of the blank on opposite sides of the cleft to be welded, means for forcing the edges of the tubular blank into alignment, means for yieldably clamping the tubular blank to the electrodes, means for moving one of said electrodes to establish and maintain an electric arc between the edges to be welded to heat the same to a welding temperature, and means engaging the opposite side walls of the blank after a predetermined movement of the electrode for pressing the heated edges together.

71. A welding apparatus for use in manufacturing a tubular article having a longitudinal seam, comprising welding electrodes extending longitudinally of the blank on opposite sides of the welding cleft, oppositely disposed clamping jaws extending longitudinally of the tubular blank, independently operable means within said clamping jaws for forcing the edges to be welded into alignment, means for clamping the blank to the electrodes, means for moving one of the electrodes relatively toward and away from the other electrode to establish and maintain an electric arc between the edges to heat the same to a welding temperature, and means causing said clamping jaws to engage the opposite side walls of the blank after a predetermined movement of the electrode and press the heated edges together.

72. A welding apparatus for use in manufacturing a tubular article having a longitudinal weld, comprising welding electrodes extending longitudinally of the blank on opposite sides of the cleft to be welded, a support engaging the outer walls of the blank opposite the electrodes, means for clamping the tubular blank between the electrodes and support, means for moving one of the electrodes toward and away from the other electrode to establish and maintain an electric arc between the edges to heat the same to a welding temperature, means for causing a simultaneous relatively reduced movement of the support in the direction of the electrode movement, oppositely disposed clamping jaws extending longitudinally of the blank, and means causing said clamping jaws to engage the opposite side walls of the tubular blank after a predetermined movement of the electrode to press the heated edges together.

73. A welding machine for use in manufacturing a tubular blank having a longitudinal weld, comprising welding electrodes extending longitudinally of the blank and adapted to engage the walls of the blank on opposite sides of the welding cleft, a support for the blank engaging the outer walls of the blank opposite the electrodes, means for moving the edges relative to each other to establish and maintain an electric arc between the edges to heat the same to a welding temperature, and means for pressing the heated edges together, said last named means including clamping jaws engaging a major portion of the opposite side walls of the blank to confine substantially the entire circumference of the blank during the final pressing operation.

74. A welding apparatus for use in the manufacture of a tubular article exceeding twenty feet in length and having a longitudinal weld, comprising means for bringing the edges to be welded into accurate alignment, means for applying an electric current to said edges, means for moving said edges relative to each other to establish and maintain an electric arc between the edges for the full length of the same and to thereby bring the metal of the edges to a welding temperature, and means for pressing the heated edges together to complete the weld.

75. A welding apparatus for use in the manufacture of a tubular article exceeding twenty feet in length and having a longitudinal weld, comprising a plurality of welding electrodes adapted to contact with the wall of the tubular article adjacent the edges to be welded, means for yieldably supporting the walls of the tubular article in effective electrical contact with the electrodes, means for moving the edges relative to each other to establish and maintain an electric arc between the edges for the full length thereof to heat the same to a welding temperature, and means for pressing the heated edges together to complete the weld.

76. An apparatus for welding a longitudinal seam in a tubular blank exceeding twenty feet in length, comprising welding electrodes extending longitudinally of the blank on opposite sides of the welding cleft and adapted to engage the walls of the tubular blank adjacent the edges to be welded, a support engaging the outer walls of the tubular blank opposite the electrodes, means for clamping the tubular blank between the electrodes and the support, means for moving the edges relative to each other to establish and maintain an electric arc between the edges for the full length thereof to heat the same to a welding temperature, and oppositely disposed clamping jaws for pressing the heated edges together.

77. An appartus for welding a longitudinal seam in a tubular blank exceeding twenty feet in length, comprising welding electrodes extending longitudinally of the tubular blank on opposite sides of the welding cleft, a support engaging the outer walls of the tubular blank opposite the electrodes, clamping jaws adapted to engage opposite side walls of the tubular blank, and means for effecting relative movement of the electrodes and of the clamping jaws.

78. In welding apparatus for uniting the oppositely disposed longitudinal edges of a tubular blank, in combination, a plurality of electrodes for engaging the wall of the blank, means for connecting the electrodes to a source of power, an arbor for mounting in the blank to engage the wall, means for supporting the blank, and means for effecting a cooperative action of the supporting means and electrodes to move the edges of the blank relative to one another to establish and maintain an arc.

79. In welding apparatus for uniting the oppositely disposed longitudinal edges of a tubular blank, in combination, a plurality of electrodes for engaging the walls of the blank, means for connecting the electrodes to a source of power, an arbor for mounting in the blank to engage the walls, means for supporting the blank, means for actuating the electrodes and supporting means to effect a movement of the edges of the blank relative to one another to establish and maintain an arc, and means cooperative for pressing the edges of the blank into engagement to complete the welding operation.

80. In welding apparatus for uniting the oppositely disposed longitudinal edges of a tubular blank, in combination, a plurality of electrodes for engaging the walls of the blank, electrical conductors connected to the electrodes, means for supporting the blank, and means for effecting a cooperative action of the supporting means and electrodes to move the edges of the blank relative to one another to establish and maintain an arc.

81. In welding apparatus for uniting the oppositely disposed longitudinal edges of a tubular blank, in combination, a plurality of electrodes for engaging the walls of the blank, electrical conductors connected to the electrodes, means for supporting the blank, means for effecting a cooperative action of the supporting means and electrodes to move the edges of the blank relative to one another to establish and maintain an arc, and means for maintaining a pressure contact between the electrodes and the walls of the blank.

82. In welding apparatus for uniting the oppositely disposed longitudinal edges of a tubular blank, in combination, a plurality of electrodes for engaging the walls of the blank, means for connecting the electrodes to a source of power, means mounted in the blank for supporting the walls, means for supporting the blank, and means for effecting a cooperative action of the supporting means and electrodes to move the edges of the blank relative to one another to establish and maintain an arc, said wall supporting means being cooperative to maintain a contact pressure between the electrodes and the walls of the blank and to carry the edges of the blank in alignment as they are fed relative to one another during the welding operation.

In witness whereof we have hereunto subscribed our names at Milwaukee, Wisconsin, this 8th day of March, 1930.

BIRGER T. ANDREN.
WARREN F. HEINEMAN.
WILLIAM E. CRAWFORD.